April 28, 1953  G. W. ANDERSON  2,636,229
JOINT FOR DEMOUNTABLE FURNITURE
Filed Sept. 22, 1949
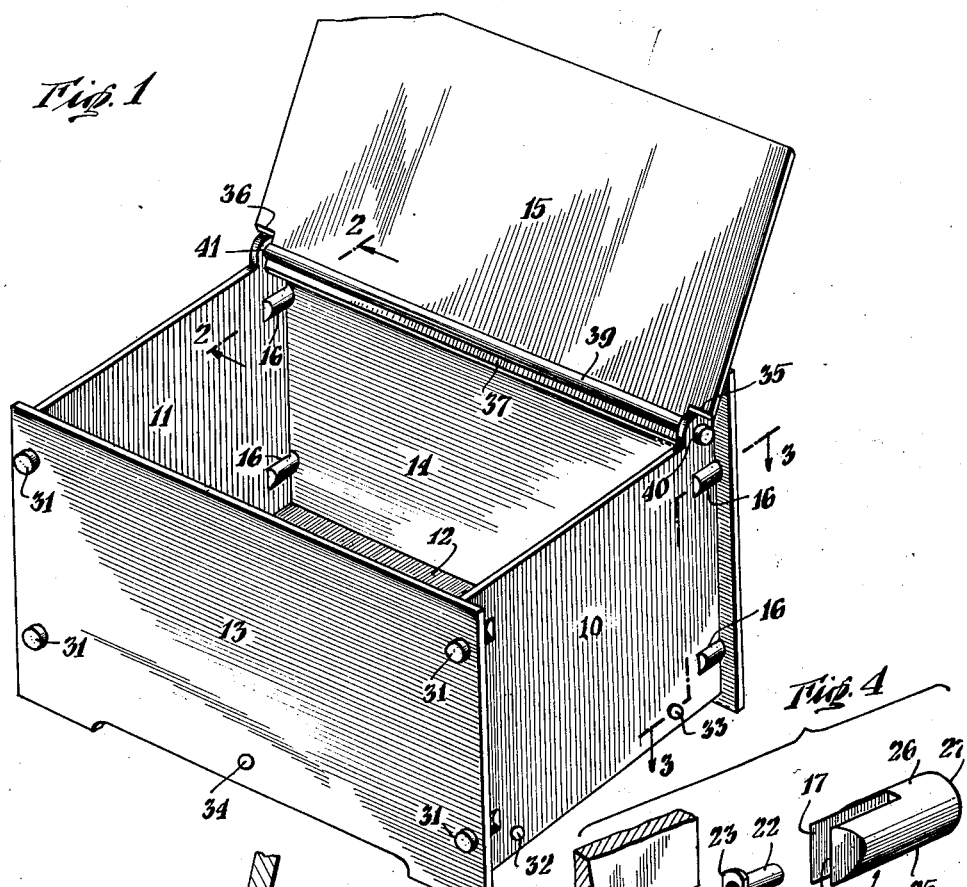
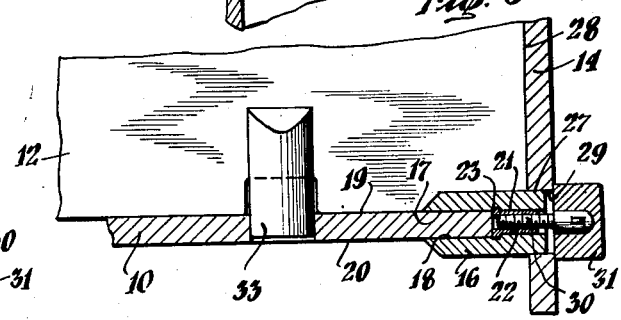
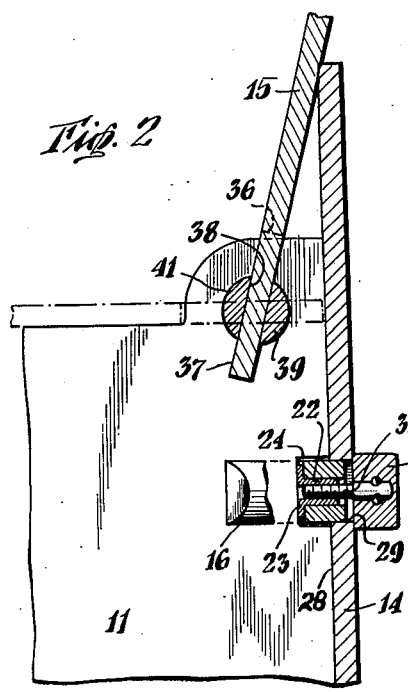
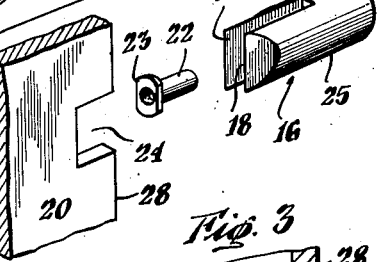
INVENTOR.
George W. Anderson
BY
Robert S. Graham
ATTORNEY Patented Apr. 28, 1953

2,636,229

UNITED STATES PATENT OFFICE 2,636,229

JOINT FOR DEMOUNTABLE FURNITURE

George W. Anderson, Port Washington, N. Y.

Application September 22, 1949, Serial No. 117,194

3 Claims. (Cl. 20—92)

This invention relates to a joint for demountably securing together sections or parts of a piece of furniture of the knock-down type.

Among the objects of the invention is to provide a joint structure suitable for securing together light parts of a piece of furniture and for enabling the ready assembly and disassembly of the related parts. The joint is suitable for firmly fastening together very thin plywood sections in abutting relationship without marring or otherwise injuring the finish of the engaged sections, regardless of the frequency of dismantling or erection. It has application to the fabrication of various styles and constructions of wooden furniture designed, and is capable of producing the utmost rigidity of the furniture in its erected condition. The joint structure is easily manipulatable for taking apart or assembling sections without the need of tools.

The joint structure includes a dowel having a slot extending from one end and terminating short of the other end, and a hole extending from said slot and through the unslotted portion of the dowel. The slot and the hole are located on the center line of the dowel. The width of the slot is such as to provide opposite surfaces which receive and engage the opposite surfaces of a plywood section or member having an edge portion fitting within the slot. The dowel contains a nut which is supported against turning. Glue is employed to fasten the opposite surfaces of the slot of the dowel to the section to which it is attached.

The dowel is attached to its supporting section at a predetermined location which is preferably established by cutting a recess in the edge of the section. This recess provides opposite edges which fit against diametrically opposite surfaces of the dowel. The other section which is to be joined to the section to which the dowel is attached, is provided with a complementary hole of such size as to be snugly engaged by the unslotted end of the dowel. For engaging the two sections, it is necessary only to move the section carrying the dowel edgewise and to guide the dowel into the hole in the section to be joined. As thus engaged, the two sections are prevented from movement in any direction transverse to the dowel.

The assembly of the two sections is made complete and their rigidity of assembly is attained by the use of screws. Each screw is provided with a wooden cap having a lateral expanse greater than the diameter of the dowel, and a threaded stem by which the screw and the nut are engaged. The length of the dowel which projects beyond the edge of the section to which it is glued is less than the thickness of the section which is held in place by the cap of the screw, and upon advancing the screw the two joined joint sections are firmly held in abutting relationship and against separation endwise of the dowel.

While the joint structure of my invention is suitable for joining together two elements of any of several types of furniture, the principle of the invention and its manner of construction and functioning can be very well explained in connection with its application to the fabrication of a chest, and I have therefore chosen to illustrate such an application in the drawings, as an example.

In the drawings, Fig. 1 is a perspective view of a simple form of chest;

Fig. 2 is a vertical section on line 2—2 of Fig. 1;

Fig. 3 is a horizontal broken section on line 3—3 of Fig. 1;

Fig. 4 is an exploded view showing a dowel, a nut and a portion of a section to which the dowel is attached.

The chest includes six plywood sections including similar end sections 10 and 11, a bottom section 12, side wall sections 13 and 14, and a hinged top 15. The section 14 is similar to the section 13 except that it extends high to provide a rest for the top when it is raised. All of these sections are separable into individual units, but the chest is maintained as an assembled piece of furniture by the use of joint structures of the present invention.

Each joint structure includes a wooden dowel 16 which is slotted from one end on the diameter of the dowel to provide a slot having opposite surfaces 17 and 18 adapted to engage the opposite surfaces 19 and 20, respectively, of a section to which the dowel is attached, as best shown in Figs. 3 and 4. Each dowel is of such length as to provide the amount of surface gluing area desired for the surfaces 17 and 18. Similar dowels are attached to the end sections 10 and 11, there being provided two dowels at each end of each of these sections for engaging the sections 13 and 14 of the chest.

The unslotted end of each dowel is axially bored or drilled to provide a hole 21 for receiving an internally threaded stem 22 of a nut having a head 23 which is shaped to be accommodated within the slot in the dowel. The nut is made of metal and the type illustrated is generally known as a T-nut. While it is preferred to provide a nut of this character, it will be appreciated that the nut may be otherwise formed or fitted within the dowel in such a manner as to prevent its turning.

The dowels are engaged with the sections 10 and 11 at predetermined locations, and these locations are preferably established by recesses 24 which are cut in the edges of the sections. These recesses are cut to such width as to engage the diametrically opposite surfaces 25 and 26 of the dowel and to such depth as to permit the unslotted end 27 of the dowel to extend beyond the edge 28 of the panel to which it is attached a distance a little less than the thickness of the section 14 when the two sections are joined in abutting relationship, as illustrated in Fig. 3.

With the nut in place within the dowel, the dowel is permanently fastened by glue to the section to which it is to be permanently attached. When this section is to be brought into abutting relationship with another section, the dowel is engaged in a complementary hole 29 of the latter section, as illustrated in Figs. 2 and 3, and the threaded stem 30 of the screw is engaged with the nut 22. The threaded stem is provided with a wooden head or knob 31 which has a lateral expanse greater than the hole 29 in the latter section. The location of the hole 29 is predetermined properly to associate the two sections in their intended relationship, and the hole is just large enough snugly to engage the dowel. By turning the cap screw the two sections may be firmly brought into abutting relationship with the head of the cap screw bearing upon the apertured section.

In the chest illustrated in the drawings, the end sections 10 and 11 are each provided with four dowels which are constructed and permanently attached to the end sections in predetermined locations in the manner above described. These eight dowels and their associated cap screws suffice to maintain the chest in assembled condition. The bottom section 12 is provided with two dowels 32, 33 at each end and a dowel 34 at each side edge. These six dowels are in slotted engagement with the edges and opposite surfaces of the bottom section and are fastened in place by means of glue. The ends of the dowels are plain and extend into matching holes in the end sections and side wall sections. One of these dowels is illustrated in Fig. 3. The dowels 32, 33 and 34 for the bottom section may be provided with nuts and screws and finished in the manner illustrated in Figs. 2 and 3, if desired, but since the sets of dowels and cooperating cap screws associated with the end sections 10 and 11 suffice to hold the chest in assembled condition, the nuts and cap screws are unnecessary.

The top section 15 is made in the form of a single panel of sufficient width to extend over the upper edges of the end sections 10 and 11 when the top section is lowered into closing position. The top section is notched at 35 and 36 to provide a wing portion 37 having such length as to fit between the end sections 10 and 11. The wing portion 37 is fitted into and attached within a coextensive slot 38 in a round hinge-bar 39. The edges of the slot 38 are glued to the surfaces of the top, and the unslotted ends of the hinge-bar are of such length as to be engaged by the bearings 40 and 41 in the end sections 10 and 11, respectively. These bearings are formed in ears projecting above the upper edges of the end sections.

It is apparent from the foregoing description of the chest and of the joint structures, that the chest may be easily assembled by first engaging the two sets of dowels 32 and 33 in the holes 29 provided for their reception in the end sections 10, 11, and at the same time engaging the ends of the hinge-bar 39 in the bearings 40 and 41. The side wall sections 13 and 14 may then be brought into assembled relationship with the end sections 10 and 11 by engaging the dowels which extend from the sections 10 and 11 with the openings or holes in the sections 13 and 14. The several cap screws are then screwed home. The vertical edges of the sections 10 and 11 can easily be brought into firm contacting relationship with the inner surfaces of the sections 13 and 14 by the turning force applicable by hand.

The utility of the joint structure of the present invention to other furniture of the knock-down type may be readily appreciated by considering the chest described as being constituted to form a cupboard or rack or other structure having shelves and in which the end section 10 is a bottom shelf and similar sections between the sections 10 and 11 are provided to serve as intermediate shelves with all of the shelves secured to the side wall sections 13 and 14 by joint structures similar to that described.

It is characteristic of the present invention that the joint structures are admirably suited for use in joining relatively thin pieces of material, such, for example, as one-quarter inch plywood sections, and that they may be so arranged and located as to contribute to the decorative character of a piece of furniture.

What is claimed is:

1. In a demountable joint structure having a first section abutting edgewise with a side of a second section disposed at substantially right angles to the first section and a fastening device holding said sections together, said device including a dowel having a slot extending from one end of said dowel and terminating short of the other end thereof and a bore extending from said slot to said other end of the dowel, said slot having side surfaces contacting with opposite sides of said first-named section, means fastening said dowel to said first-named section, said other end of the dowel extending beyond the abutting edge of said first-named section and fitting a hole in said second-named section with said other end terminating between the opposite sides of said second-named section, a nut element having a threaded portion concentric to said bore and a head disposed in said slot and extending crosswise of said dowel beyond the diameter of said bore, and a cap screw having a threaded stem engaging said threaded portion of said nut element and a cap having a greater lateral expanse than the diameter of said hole, said cap engaging said second-named section thereby holding said first-named and said second-named sections in abutting relationship and against separation in any direction.

2. In a demountable joint structure having a first section abutting edgewise with a side of a second section disposed at substantially right angles to the first section and a fastening device holding said sections together, said device including a dowel having a slot extending from one end thereof and terminating short of the other end of the dowel and a bore extending from said slot to said other end of the dowel, said slot having side surfaces contacting with opposite sides of said first-named section, means fastening said dowel to said first-named section, said other end of the dowel extending beyond the abutting edge of said first-named section and fitting a hole in said second-named section with said other end terminating between the opposite sides of said second-named section, a nut element having a threaded portion concentric to said bore and held from rotation in said dowel, and a cap screw having a threaded stem engaging said nut element and a cap having a greater lateral expanse than the diameter of said hole, said cap engaging said second-named section thereby firmly holding said first-named and said second-named sections in abutting relationship and against separation in any direction.

3. In a demountable joint structure having a first section abutting edgewise with a side of a second section disposed at substantially right angles to the first section and a fastening device holding said sections together, said device including a dowel having a slot extending from one end of said dowel and terminating short of the other end thereof and a bore extending from said slot to said other end of the dowel, an intermediate portion of said dowel being disposed in a recess in the abutting edge of said first-named section, the slotted end of said dowel providing a leg at either side of said slot contacting with opposite sides of said first-named section and said other end of said dowel engaging within a hole in said second-named section, a nut element having a threaded portion concentric to said bore and held from rotation in said dowel, and a screw engaging said nut element, said screw having a cap contacting with said second-named section, said cap being wider than the diameter of said hole.

GEORGE W. ANDERSON.

References Cited in the file of this patent

UNITED STATES PATENTS

| Number | Name | Date |
|---|---|---|
| 1,211,760 | Rothweiler | Jan. 9, 1917 |
| 1,605,597 | Long | Nov. 2, 1926 |